US008590915B2

(12) United States Patent	(10) Patent No.:	US 8,590,915 B2
Connell	(45) Date of Patent:	Nov. 26, 2013

(54) SUPPORT SYSTEM FOR ARTICULATING HITCHES

(76) Inventor: Colin Connell, Lapeer, MI (US)

( * ) Notice: Subject to any disclaimer, the term of this patent is extended or adjusted under 35 U.S.C. 154(b) by 86 days.

(21) Appl. No.: 13/280,512

(22) Filed: Oct. 25, 2011

(65) Prior Publication Data
US 2012/0098234 A1 Apr. 26, 2012

Related U.S. Application Data

(60) Provisional application No. 61/406,284, filed on Oct. 25, 2010.

(51) Int. Cl.
B60D 1/34 (2006.01)
B62D 53/00 (2006.01)
(52) U.S. Cl.
USPC ............... 280/405.1; 280/406.1; 280/407
(58) Field of Classification Search
USPC .................. 280/405.1, 406.1, 407
See application file for complete search history.

(56) References Cited

U.S. PATENT DOCUMENTS

| | | |
|---|---|---|
| 3,700,261 A | 10/1972 | Suckow |
| 3,700,262 A | 10/1972 | Suckow |
| 3,731,950 A | 5/1973 | Burcham |
| 4,275,897 A | 6/1981 | Moyer |
| 5,799,965 A | 9/1998 | Kass et al. |
| 6,851,696 B1 | 2/2005 | Hensley |

Primary Examiner — Kevin Hurley
Assistant Examiner — Marc A Scharich
(74) Attorney, Agent, or Firm — Young Basile Hanlon & MacFarlane

(57) ABSTRACT

A system for providing support to an articulating trailer hitch used to interconnect a trailer and a towing vehicle. The system includes an adjustable, removable and repositionable link which interconnects the trailer frame and one or more spring bars providing load-distributing forces to the trailer and towing vehicle. The spring bars include an adjustable, rigid link which maintains the vertical position of the hitch assembly when disconnected from the towing vehicle.

6 Claims, 3 Drawing Sheets

FIG. 3
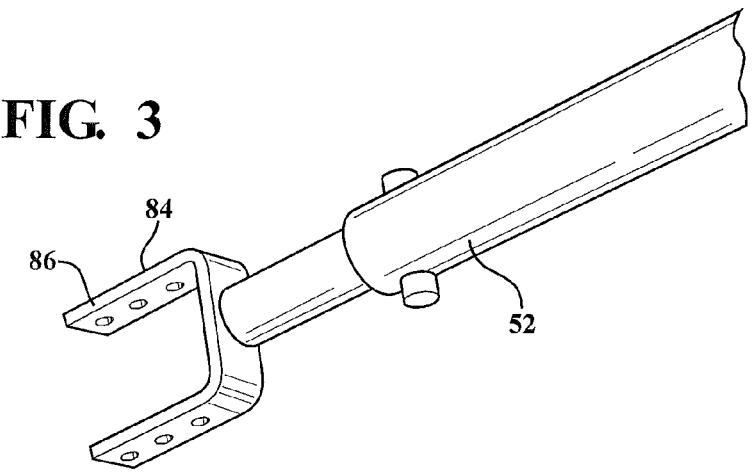
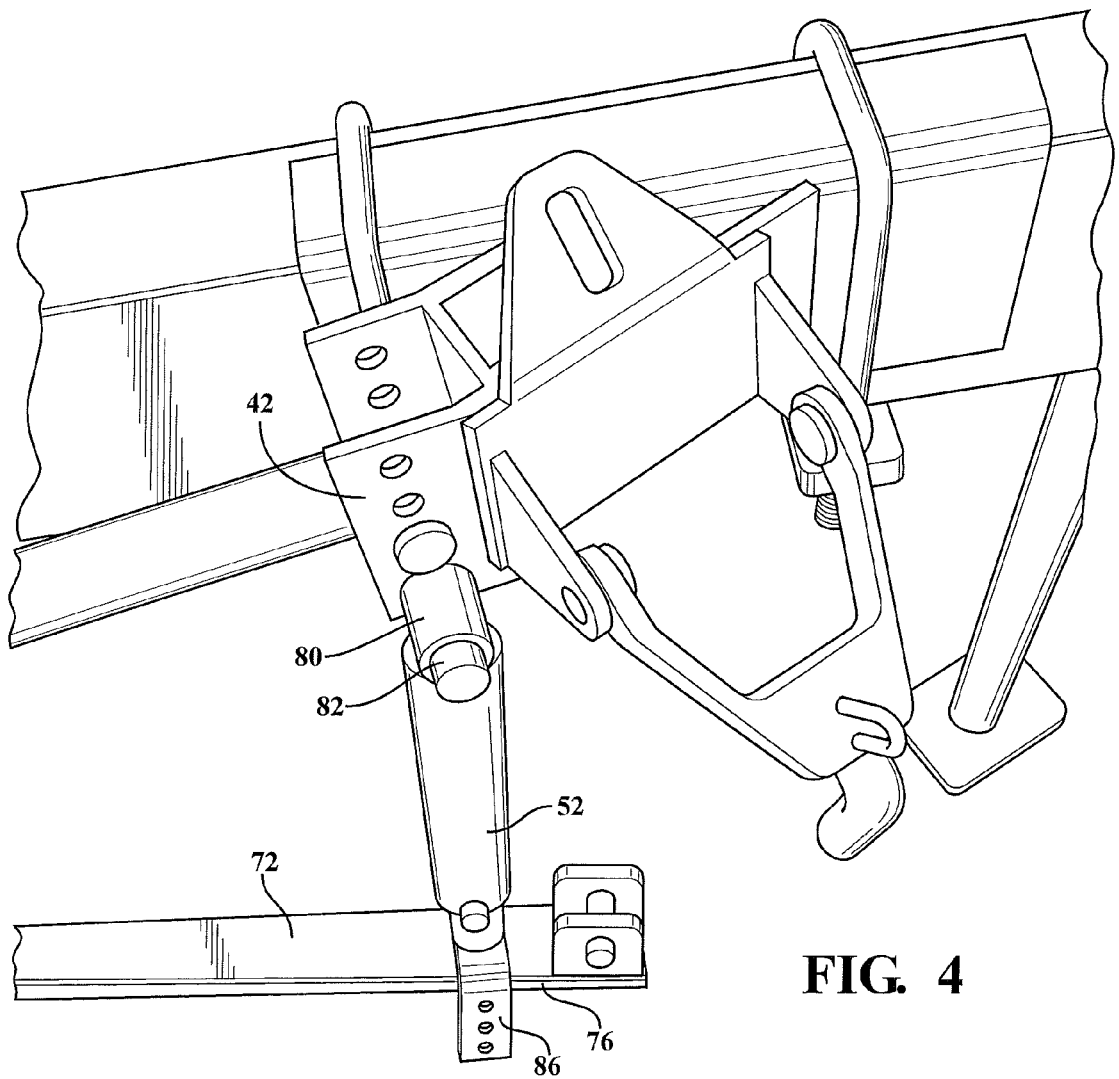
FIG. 4

SUPPORT SYSTEM FOR ARTICULATING HITCHES

RELATED U.S. APPLICATION DATA

This application claims the benefit of U.S. Provisional Application No. 61/406284, filed Oct. 25, 2010.

FIELD OF THE INVENTION

The present invention pertains to load leveling trailer hitches, and more particularly, to a device and method for confining the movement of elements of a load-leveling trailer hitch.

BACKGROUND

Mechanisms for interconnecting a motor vehicle to a trailer have been utilized extensively. Typically, a ball-type hitch is attached to the frame or bumper of a towing vehicle and a corresponding ball-type socket is secured to the trailer frame. The ball-type socket engages the ball-type hitch so described, and a locking mechanism secures the ball-type hitch and ball-type socket together, while still allowing the ball-type hitch and ball-type socket to rotate in relation to one another, thereby allowing the towed vehicle to articulate in relation to the towing vehicle in at least two axes. With relatively lightweight trailers, the afore described system results in a towed/towing vehicle combination which is useful, simple and safe to operate.

However, modern towing vehicles and trailers, operating at highway speeds, often present interesting and difficult vehicle handling problems. Depending on the centers of gravity and centers of aerodynamic pressure associated with the towing and towed vehicles, towed vehicles exhibit a tendency to oscillate or wander, a tendency which can be dangerous at high speeds. Further, vehicle operators typically increasingly demand more load-carrying capability from both towing vehicles and towed vehicles, resulting in much heavier vehicle weights, which in turn impose substantially higher mechanical loads on the vehicles. Because of these increased demands, more specialized, load leveling trailer hitch mechanisms have been developed which serve to more evenly distribute the tongue weight of the trailer over the front and rear axles of the towing vehicle. Further, it has been discovered that converging link configurations for trailer hitches can dramatically improve vehicle and trailer handling at highway speeds, such as those taught in U.S. Pat. Nos. 6,851,696 and 4,811,967.

While load distributing and converging link trailer hitch systems have gained in popularity over recent years, they suffer from certain limitations. First, load distributing and converging link hitch systems are heavy, making it inconvenient to remove components of the towing system from both the towing and the towed vehicles. Further, the systems are complex, requiring the addition of components to or modifications to the trailer tongue or frame. Additionally, because the trailer-towing system is exposed to the weather and to the conditions found on the roadway, the mechanical components of the system become soiled, and it is undesirable to be required to disassemble and reassemble the various components of the system when it is desired to put the system to use.

For these reasons, it is generally preferable to utilize a single receiver assembly attached to or integral with the towing vehicle which can be readily adapted to engage the elements on the tongue of the trailer. Typically, such a receiver is in the form of a rectangular cross-section socket, into which fits a corresponding rectangular cross-sectioned plug, which will be secured to the socket utilizing a bolt and nut, or a pin. In this configuration, almost the entire trailer hitch assembly remains associated with the trailer when the towing vehicle is disconnected.

Unfortunately, such a configuration may allow the forward part of the trailer hitch to sag or droop, making it difficult to align with and reattach to the socket in the towing vehicle. This is particularly true where the spring bar portions of the trailer hitch assembly are secured at their proximal end to the converging link assembly and that their distal end to chains which are suspended from the trailer frame. When spring tension is removed from the spring bars of the trailer hitch, the spring bars are free to swivel, and provide no support to the converging link portion of the trailer hitch.

It has been known to solve this problem by the incorporation of rigid jack elements which attach the distal end of the spring bar to the trailer frame. This allows the tension on the spring bars to be selectively relaxed, and further allows for precise positioning of the distal end of the spring bar in relation to the trailer frame. Unfortunately, this solution is incomplete, particularly when adapted for use on trailers having a so-called V-nose. V-nose trailers have a somewhat arrow-shaped cross-section which serves to streamline the trailer and make the trailer towing operation more fuel-efficient. Current jack systems of the type described protrude into the V-shaped frame of these trailers, creating the potential for interference between the front of the trailer compartment and the jacks.

The present invention overcomes these limitations as will be further described herein.

BRIEF DESCRIPTION OF THE DRAWINGS

The description herein makes reference to the accompanying drawings wherein like reference numerals refer to like parts throughout the several views, and wherein:

FIG. 3 is a perspective view of the securement link portion of the system

FIG. 4 is a perspective view of the forward portion of the trailer hitch assembly, including the converging link component.

DETAILED DESCRIPTION

The following detailed description illustrates the structure and operation of the invention, which will be best understood by reference to the following disclosure, as well as FIGS. 1-4.

A conventional trailer is provided with a metal frame which forms the underlying support for the towed vehicle, including the attachment points for the trailer axles on which the frame rests. The trailer frame supports a bed or an enclosure in which cargo may be carried. The forward end of the trailer includes a frame extension, sometimes referred to as a "tongue". The trailer tongue is typically equipped with the necessary mechanism for securing the trailer to the towing vehicle.

As previously described, the towing vehicle is conventionally equipped with a receiver, usually in the form of a socket. A ball-type hitch attached to a plug is inserted into the socket, and the plug and socket are secured together using a pin, nut and bolt, or other well-known means. Once this operation has been completed, the trailer hitch ball is rigidly secured to the receiver, which, in turn, is conventionally welded or bolted to the frame of the towing vehicle.

The frame of the trailer is of generally box-shaped construction, and affixed thereto is a bracket, utilizing U-bolts. The bracket supports a lever assembly consisting of a pair of tangs pivotally attached to a lever element.

At the forward end of the trailer, a hitch assembly comprised of a hitch bar is coupled to a hitch box enclosing a pair of links which are pivotally secured to the upper and lower portions of the hitch box. The converging link elements of the hitch box create the effect of moving the hitch point close to the rear axle of the towing vehicle, and hence, the towing vehicle steering input does not exaggerate the trailer's lateral movement. One or more struts may be added to the linkage to dampen movement, and to prevent the trailer hitch from rotating around the ball. All pivoting takes place in the linkage within a converging link unit, not at the hitch ball.

When the hitch bar is withdrawn from the receiver on the vehicle, natural weight of the assembly causes it to sag or droop.

Figure 1:
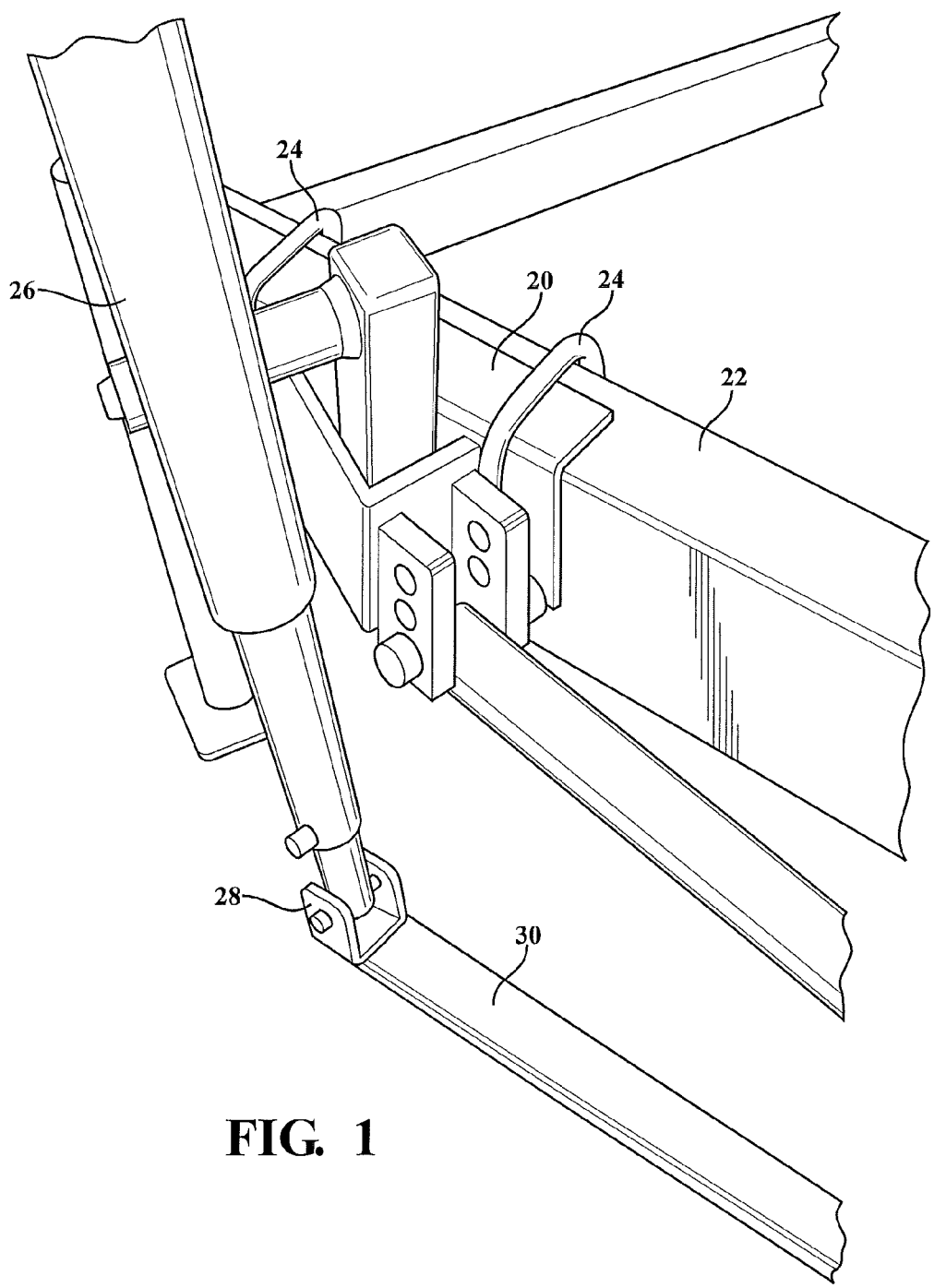
FIG. 1 is a perspective view of the prior art in relation to a load leveling, converging link trailer hitch system.

One method of preventing this occurrence is the use of an adjustable jack as shown in FIG. 1. In this configuration, a bracket 20 is attached to the trailer frame 22 using U-bolts 24. The upper end of a jack 26 is attached to a bracket, and the lower end of the jack 28 is attached to the distal end of the spring bar 30. The proximal end of the spring bar 30 is secured into the forward part of the hitch assembly (not shown). Tension on the spring bar 30 may be adjusted by adjustment of the jack 26. By virtue of the rigid interconnection of the trailer frame 22, bracket 20 and jack 26, the distal end of the spring bar 30 is held in a fixed position in relation to the trailer frame 22, and the spring bar 30 provides vertical support to the converging link trailer hitch assembly (not shown), holding the assembly in relatively fixed position, which allows the vehicle and trailer to be easily interconnected. However, as can be seen from FIG. 1, the upper portion of the jack 26 presents an obstacle to portions of the trailer body which may project forward from the trailer frame.

Figure 2:
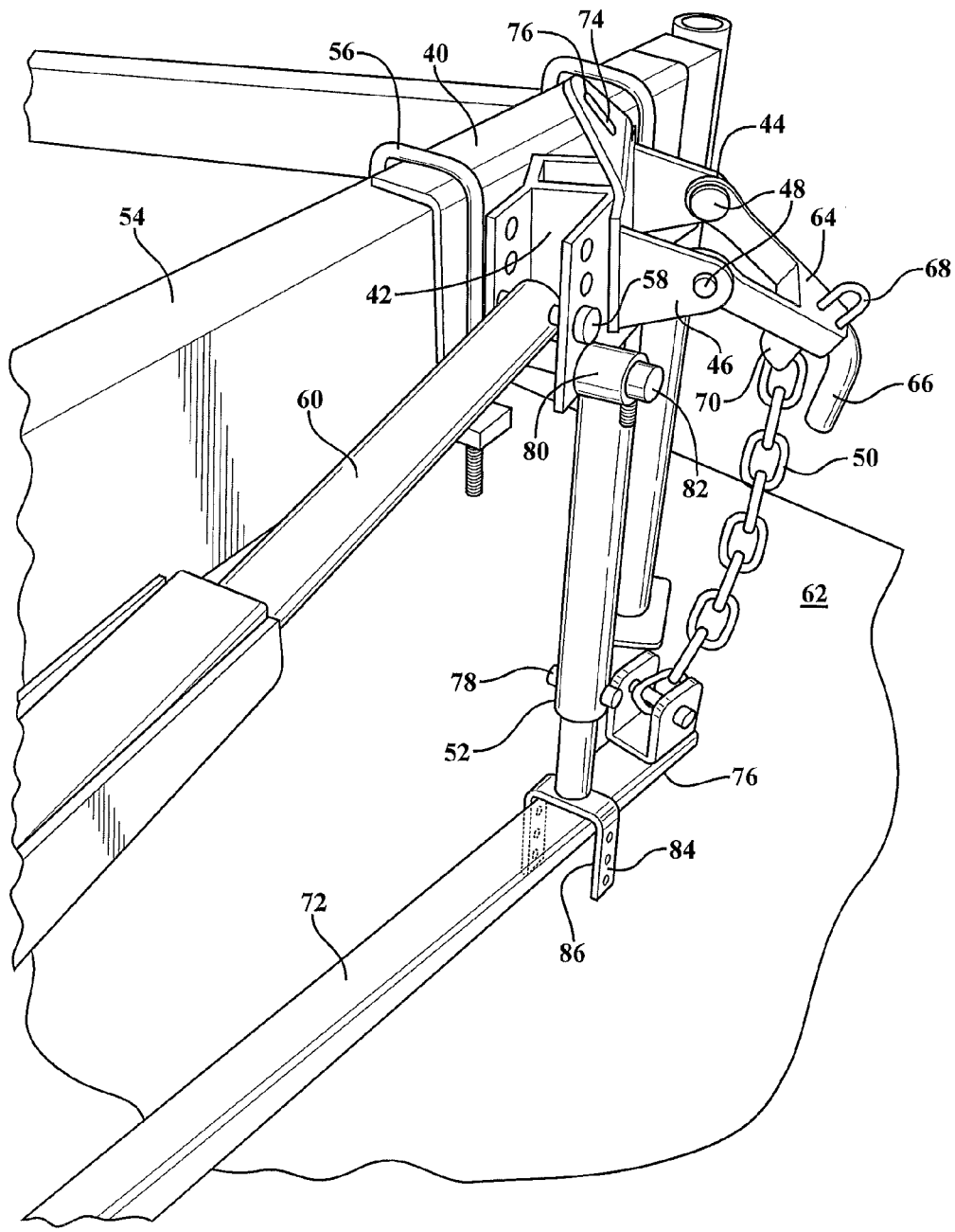
FIG. 2 is a perspective view of elements of the system configured at the distal end of the load leveling spring bars.

FIG. 2 shows an embodiment of the present invention, including a modified bracket 40 which contains a U-shaped support flange 42, a pair of tangs 44, 46, a pivot lever 64 and chain 50, and an adjustable rigid link 52.

The modified bracket 40 is mounted securely to the trailer frame 54 utilizing U-bolts 56. The support flange 42 accepts a pin 58 which engages a brace 60. The brace 60 restricts rotation of a portion of the hitch assembly (not shown). The modified bracket 40 also incorporates a tensioner comprising a pair of tangs 44, 46 fitted with pivots 48, which engage the pivot lever 64 provided with a plug 66, a hook 70 and an eye 68. When the trailer is configured for towing, a chain 50 interconnects the distal end 76 of the spring bar 72 and the hook 70 mounted to the lever 64. The lever 64 is then rotated upward about the pivots 48, until the eye 68 of the lever 64 engages a slot 74 mounted on a third tang 6 on the bracket 40. A pin or other securing element (not shown) can be placed through the eye 68, preventing the lever 64 from rotating. In this configuration, tension is applied to the chain 50, which in turn supplies tension to the distal end 76 of the spring bar 72, thereby applying the necessary load leveling forces to the trailer hitch assembly (not shown), achieving the desired result of dispersing the trailer weight loads evenly between the axles of the towing vehicle.

When it is desired to park the trailer and separate the trailer from the towing vehicle, the support system of the present invention incorporates the adjustable rigid link 52 which is positioned between the support flange 42 and the distal end 76 of the spring bar 72. Prior to separating the towing vehicle and the trailer, the lever 64 is rotated downward as shown in FIG. 2 about the pivots 48, thereby releasing the tension on the spring bar 72. The adjustable rigid link 52 is provided with one or more holes and pins 78. In this fashion, the overall length of the adjustable rigid link 52 can be adjusted. The upper end of the adjustable rigid link 52 is provided with an eye 80 through which a pin 82 is inserted, passing through openings in the support flange 42, thereby securing the adjustable rigid link 52 at its upper end, to the bracket 40 and support flanges 42. At the opposite end of the link is a fork 84 which captures the distal end of the spring bar, and one or more holes 86 in the fork 84 accept a locking pin (not shown) which captures the underside of the distal end 76 of the spring bar 72, thereby providing vertical support to the spring bar 72 at its distal end 76. FIGS. 3 and 4 show additional views of embodiments of this invention. FIG. 3 shows the adjustable rigid link 52 with a fork 84 with one or more holes 86. FIG. 4 shows the distal end 76 of the spring bar 72 operatively connected to the adjustable, rigid link 52 by the fork 84. The adjustable rigid link 52 is connected to the support flange 42 by a pin 82 inserted through an eye 80 attached to the link 52.

It will be appreciated that this combination of elements eliminates the requirement for a jack to raise and lower the distal end of the spring bar, thereby eliminating the potential for interference between the upper end of the jack and the body or load being carried on the trailer frame. Further, this configuration provides the necessary support for the converging link trailer hitch assembly in that the supporting link holds the distal end of the spring bar in position, so that the towing vehicle may be removed without allowing the converging link and load leveling trailer hitch assembly to sag or otherwise become misaligned.

When it is time to interconnect the vehicles again, the trailer hitch assembly is already in position for interconnection. Once the converging link/load leveling portion of the hitch has been reattached to the towing vehicle socket, the link assembly can be removed from its position interconnecting the support bracket and the distal end of the spring bar, and tension can be reapplied to the lever, thereby providing tension to the chain and to the spring bar itself, thereby applying the necessary load to the spring bar.

Having thus described my invention, numerous obvious modifications and improvements thereto may be made by the skill of artisan, without departing from the substance of my invention, which I claim as follows:

1. A support system for interconnecting a trailer having a trailer frame, and a towing vehicle, comprising:
   at least one spring bar that is configured to provide leveling forces to said trailer and said towing vehicle;
   a tensioner having a first end connected to said trailer frame and a second end connected to said at least one spring bar, wherein said tensioner is moveable between a tensioned position, in which tension is applied to the at least one spring bar, to a released position, in which the tension is released from the at least one spring bar; and
   an adjustable, substantially rigid link that has a first end that is connected to said trailer frame and a second end that is connectable to the at least one spring bar, wherein the link is moveable between an engaged position, in which said link substantially rigidly interconnects said spring bar and said trailer frame, and a disengaged position, in which said link does not rigidly interconnect said spring bar and said trailer frame.

2. The system of claim 1 wherein said tensioner includes a chain that is connected to the at least one spring bar and a lever that is connected to the chain and to the trailer frame wherein pivoting of the lever between a first position and a second position corresponds to movement of the tensioner between the tensioned position and the released position.

3. The system of claim 2 wherein said rigid link moves from the disengaged position to the engaged position upon said tensioner moving from the tensioned position to the released position.

4. The system of claim 1 wherein said rigid link, when in the engaged position, maintains a position of said at least one spring bar so that said towing vehicle can be disconnected from said trailer without allowing a hitch mechanism of the trailer to become misaligned.

5. The support system of claim 1, wherein said rigid link includes an elongate member that extends downward from said trailer frame.

6. A method for supporting at least one spring bar that provides leveling forces to a trailer having a trailer frame and a towing vehicle that is connectable to the trailer, the method comprising:

providing an assembly including a tensioner and a substantially rigid link, the tensioner having a first end connected to the trailer frame and a second end connected to said at least one spring bar;

operating the towing vehicle with the trailer connected thereto with the assembly in a first configuration wherein the tensioner is in a tensioned position in which the tensioner applies tension to the at least one spring bar and the substantially rigid link is in a disengaged position in which the substantially rigid link does not rigidly interconnect the trailer frame and the at least one spring bar;

moving the assembly to a second configuration wherein the tensioner is in a released position in which the tensioner releases tension from the at least one spring bar and the substantially rigid link does not rigidly interconnect the trailer frame and the at least one spring bar and the substantially rigid link is in an engaged position in which the substantially rigid link substantially rigidly interconnects the trailer frame and the at least one spring bar; and disconnecting the trailer with respect to the towing vehicle while the assembly is in the second configuration.

* * * * *